United States Patent
Lee et al.

(10) Patent No.: US 11,920,027 B2
(45) Date of Patent: Mar. 5, 2024

(54) HIGHLY $CO_2$-PERMEABLE AND SELECTIVE POLYMER BLEND MEMBRANE AND PROCESS FOR PREPARING THE SAME

(71) Applicant: SOGANG UNIVERSITY RESEARCH & BUSINESS DEVELOPMENT FOUNDATION, Seoul (KR)

(72) Inventors: Jong Suk Lee, Seoul (KR); Munsuk Seong, Seoul (KR); Heseong An, Chungcheongbuk-do (KR); Ju Ho Shin, Seoul (KR)

(73) Assignee: SOGANG UNIVERSITY RESEARCH & BUSINESS DEVELOPMENT FOUNDATION (KR)

( * ) Notice: Subject to any disclaimer, the term of this patent is extended or adjusted under 35 U.S.C. 154(b) by 0 days.

(21) Appl. No.: 17/735,148

(22) Filed: May 3, 2022

(65) Prior Publication Data
US 2022/0372270 A1    Nov. 24, 2022

(30) Foreign Application Priority Data

May 6, 2021 (KR) .................. 10-2021-0058846
Apr. 19, 2022 (KR) .................. 10-2022-0048287

(51) Int. Cl.
*C08L 53/00* (2006.01)

(52) U.S. Cl.
CPC ........... *C08L 53/00* (2013.01); *C08L 2205/02* (2013.01)

(58) Field of Classification Search
CPC ...... C08L 2205/02; C08L 53/00; C08L 71/02; C08L 71/00; C08L 77/00
See application file for complete search history.

(56) References Cited

PUBLICATIONS

Shin et al Journal of Membrane Science (2019) 300-308 (Year: 2018).*
Car et al Journal of Membrane Science (2008) 88-95 (Year: 2008).*
Robeson, "The Upper Bound Revisited", Journal of Membrane Sience, Elsevier, Lehigh University, PA, Jan. 28, 2008, 320, pp. 390-400.
S. Metz et al., "Gas-Permeation Properties of Poly(Ethylene Exide) Poly(Butylene Terephthalate) Block Copolymers", University of Twente, The Netherlands, Jan. 22, 2004, vol. 37, No. 12, pp. 4590-4597.
W. Yave et al., "Gas Permeability and Free Volume in Poly(Amide-B-Ethylene Oxide)/Polyethylene Glycol Blend Membranes", Elsevier, Journal of Membrane Science, Nov. 19, 2008, 339, pp. 177-183.

(Continued)

*Primary Examiner* — Mark S Kaucher
(74) *Attorney, Agent, or Firm* — Harness, Dickey & Pierce, P.L.C.

(57) ABSTRACT

A polymer blend membrane includes a polyether-based copolymer and a polyether polymerized in situ and has high permeability and high selectivity for carbon dioxide. In the polymer blend membrane, the free volume of the polyether-based copolymer is greatly increased, and the adsorption capacity for carbon dioxide is enhanced. Thus, it can have excellent mechanical properties and excellent permeability and selectivity for carbon dioxide.

9 Claims, 8 Drawing Sheets

(56) References Cited

PUBLICATIONS

H. Lin et al., "Plasticization-Enhanced Hydrogen Purification Using Polymeric Membranes", Science, Feb. 3, 2006, vol. 311, pp. 639-643.
Y. Wu et al., "The Effect of Structure Change From Polymeric Membrane to Gel Membrane on CO2 Separation Performance", Elsevier, Separation and Purification Technology, 2021, 261, pp. 1-10.

* cited by examiner

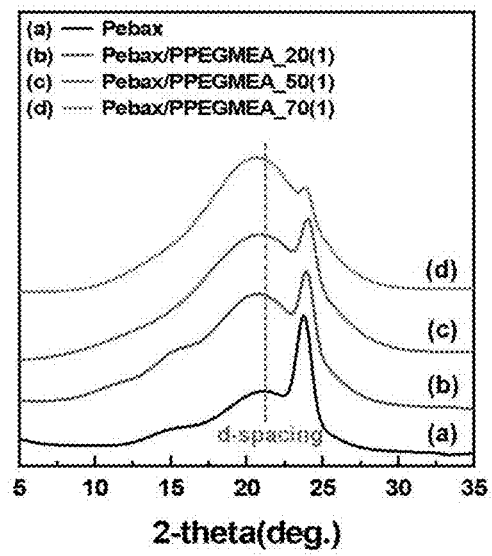
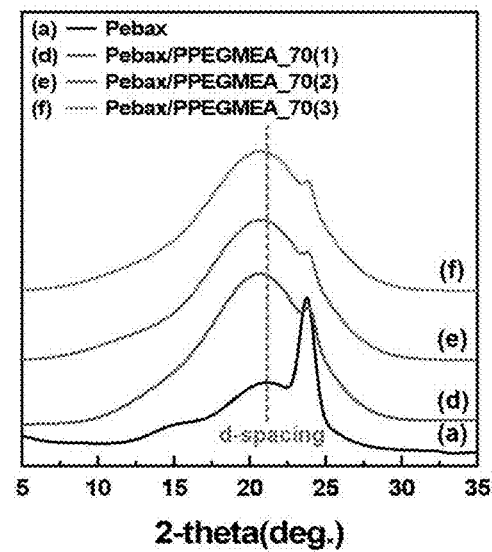
Fig. 4(a)                               Fig. 4(b)
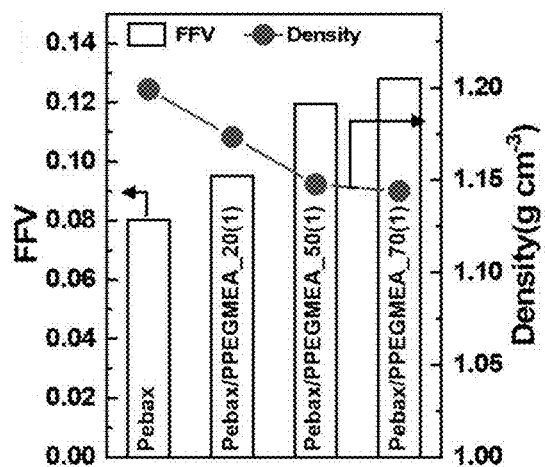
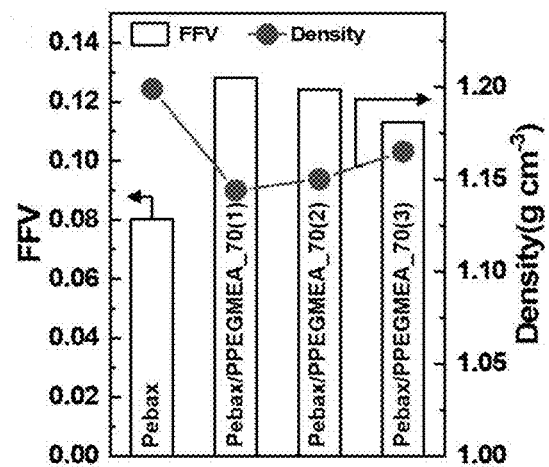
Fig. 5(a)                               Fig. 5(b)

Fig. 7
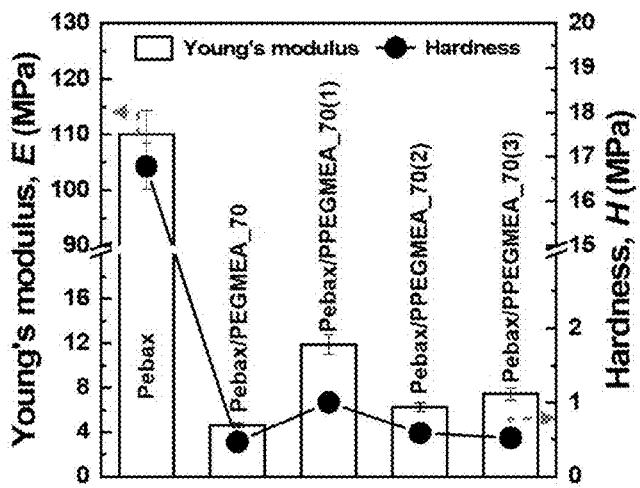
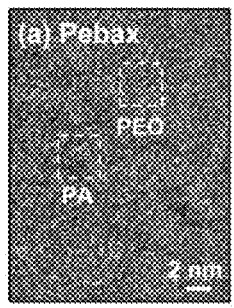 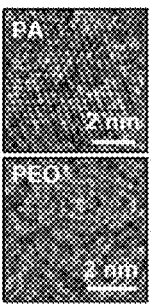 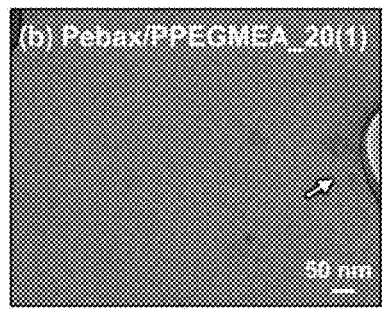 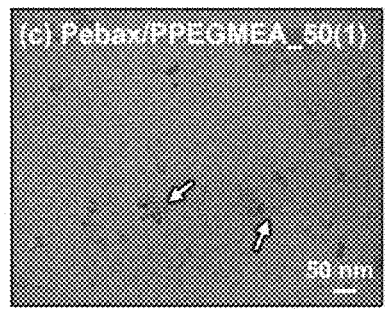
Fig. 8(a)　　　　　　　Fig. 8(b)　　　　　　　Fig. 8(c)
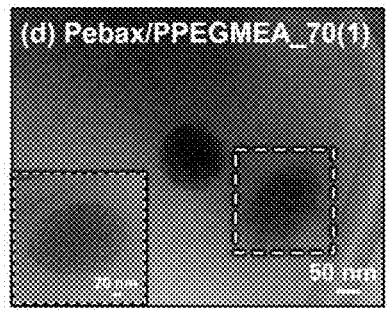 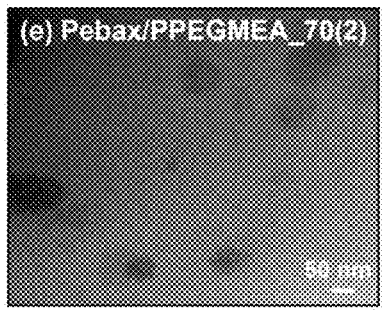 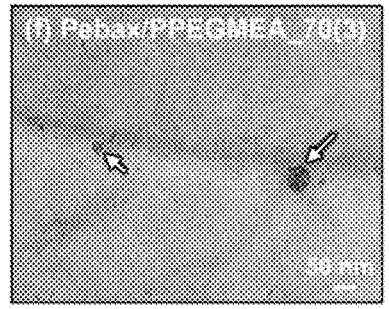
Fig. 8(d)　　　　　　　Fig. 8(e)　　　　　　　Fig. 8(f)

HIGHLY $CO_2$-PERMEABLE AND SELECTIVE POLYMER BLEND MEMBRANE AND PROCESS FOR PREPARING THE SAME

CROSS-REFERENCE TO RELATED APPLICATIONS

This application claims priority to Korean Patent Application Nos. 10-2021-0058846, filed on May 6, 2021, and 10-2022-0048287, filed on Apr. 19, 2022, and all the benefits accruing therefrom under 35 U.S.C. § 119, the contents of which in their entirety are herein incorporated by reference.

BACKGROUND

1. Field

The present invention relates to a polymer blend membrane having high permeability and high selectivity for $CO_2$ and to a process for preparing the same. More specifically, the present invention relates to a polymer blend membrane having high permeability and high selectivity for carbon dioxide, in which the formation of a polyether polymer having a spherical micellar structure is induced in a polyether-based copolymer matrix by applying heat to a mixed solution composed of a polyether-based copolymer, a polyether oligomer, and an initiator in a polymerization reactor, and to a process for preparing the same.

This work was supported by C1 Gas Refinery Program through the National Research Foundation of Korea (NRF) funded by the Ministry of Science and ICT (Project No. 2019M3D3A1A01069101) and Korea Institute of Energy Technology Evaluation and Planning (KETEP) grant funded by the Korea government (MOTIE) (20212010200110, Development of compact $CO_2$ capture technology for combustion exhaust gas of urban LNG power plant).

2. Description of the Related Art

Efforts to reduce $CO_2$, which has a significant impact on global warming, are continuously being made. A gas separation membrane technology is being used for the separation and purification of carbon dioxide, and membranes using various polymers are being developed. However, conventional polymer membranes have a conflicting relationship between permeability and selectivity. As a result, there is a limit to the separation performance that is recognized as an upper bound for various separation target gases such as $CO_2/N_2$ and $CO_2/CH_4$ (see J. Membr. Sci, 2008, 320, 390-400).

In order to enhance the $CO_2$ separation performance, membranes using a polymer material containing ethylene oxide, which has a good affinity with $CO_2$ by a dipole-quadrupole interaction, have been actively developed. Polyethylene oxide (PEO)-based polymers, which are a kind of polyether, have a problem of low permeability due to their high crystallinity, and polyethylene glycol (PEG), which is a low molecular weight of PEO, has a disadvantage in that it has weak mechanical strength. To solve this problem, studies on introducing PEG into block copolymers containing PEG, crosslinked polymers, polymeric blends, and inorganic materials have been conducted (see Macromolecules, 2004, 37, 4590-4597, J. Membr. Sci, 2009, 339, 177-183, Science, 2006, 311, 639-642).

Meanwhile, polymer blends are attracting a lot of attention as a very practical method because the advantages of each polymer can be achieved through a simple preparation process. When a low-molecular-weight of PEG is mixed with the matrix of a PEG-blend membrane, the fractional free volume (FFV) of the polymer matrix is increased, so that the gas permeability can be enhanced. However, if PEG is introduced in an excess (e.g., 50% or more) into the polymer matrix, the mechanical properties of the membrane are significantly deteriorated. Accordingly, there is a demand for the development of a polymer blend membrane having excellent mechanical properties and gas permeability even when polyethylene glycol is introduced in a high content into the polymer matrix.

SUMMARY

Technical Problem to be Solved

An object of the present invention is to provide a polymer blend membrane having excellent mechanical properties and gas permeability even when polyethylene glycol is introduced in a high content into the polymer matrix.

Another object of the present invention is to provide a process for preparing a polymer blend membrane having excellent mechanical properties and gas permeability even when polyethylene glycol is introduced in a high content into the polymer matrix.

Solution to the Problem

According to an embodiment of the present invention, there is provided a polymer blend membrane, which comprises, based on the total weight of components (A) and (B), (A) 30 to 90% by weight of a polyether-based copolymer; and (B) 10 to 70% by weight of a polyether.

According to another embodiment of the present invention, there is provided a process for preparing a polymer blend membrane, which comprises (1) dissolving a polyether-based copolymer resin; a polyether oligomer containing a vinyl group; and an initiator in a solvent; (2) subjecting the polyether oligomer containing a vinyl group to in-situ radical polymerization; and (3) molding the product obtained in step (2) in the form of a membrane and removing the solvent therefrom.

Advantageous Effects of the Invention

In the polymer blend membrane according to an embodiment of the present invention, the free volume of the polyether-based copolymer is greatly increased, and the $CO_2$ sorption capacity is enhanced. Thus, it can have excellent permeability and selectivity for carbon dioxide and durable mechanical properties.

BRIEF DESCRIPTION OF THE DRAWINGS

FIGS. 4(a) and (b) show an X-ray diffraction (XRD) spectrum of a polymer membrane prepared according to an embodiment of the present invention.

FIGS. 5(a) and (b) are graphs showing the fractional free volume and density of a polymer membrane prepared according to an embodiment of the present invention.

FIG. 7 is a graph showing Young's modulus and hardness of a polymer membrane prepared according to an embodiment of the present invention.

FIGS. 8(a)-(f) show a transmission electron microscopy (TEM) image of a polymer membrane prepared according to an embodiment of the present invention.

DETAILED DESCRIPTION

Figure 1:
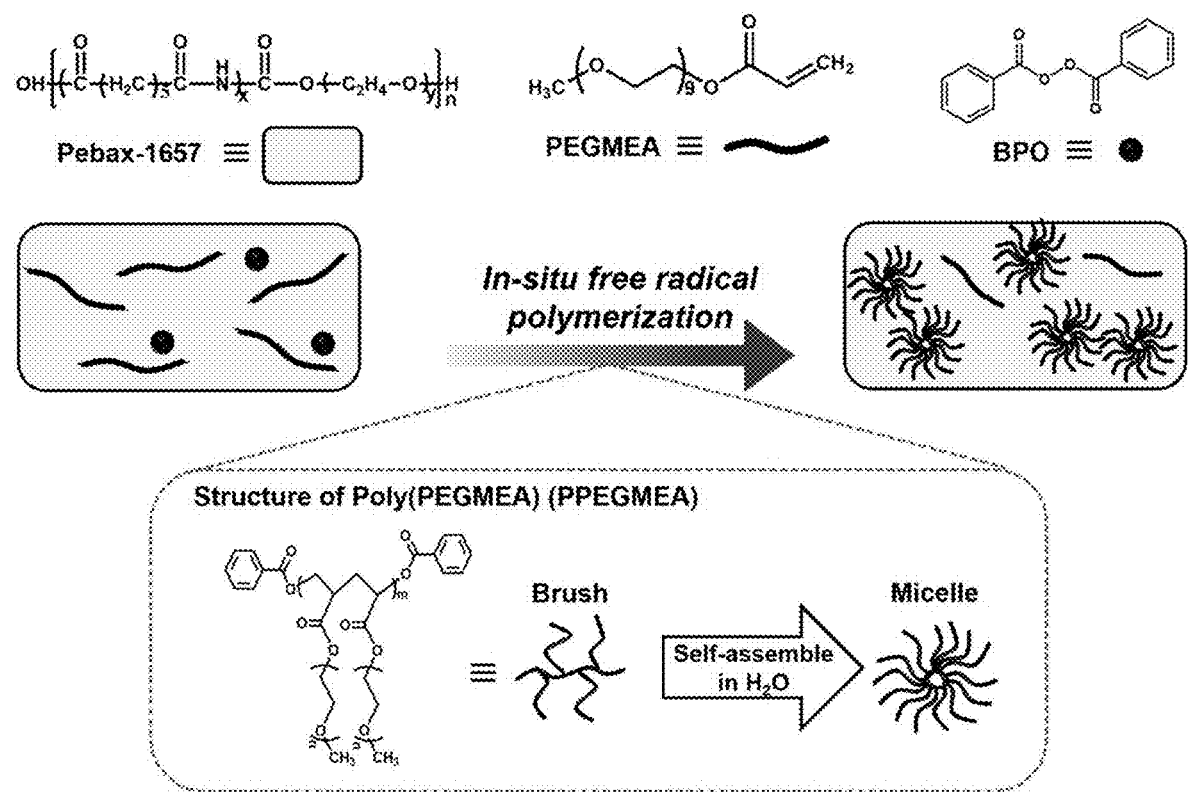
FIG. 1 is a schematic diagram of a membrane prepared according to an embodiment of the present invention.

Hereinafter, the present invention is explained in more detail.

Polymer Blend Membrane

According to an embodiment of the present invention, there is provided a polymer blend membrane, which comprises, based on the total weight of components (A) and (B), (A) 30 to 90% by weight of a polyether-based copolymer; and (B) 10 to 70% by weight of a polyether.

The polymer blend membrane according to an embodiment of the present invention comprises a polyether-based copolymer (A). Here, the polyether-based copolymer (A) serves as a matrix.

In a specific embodiment of the present invention, the polyether-based copolymer (A) may comprise at least one selected from the group consisting of poly(ether-amide) (PEA), poly(ethylene oxide) (PEO), polyethersulfone (PES), and poly(ether-imide) (PEI), but it is not particularly limited thereto.

In a preferred embodiment of the present invention, the polyether-based copolymer (A) may comprise a poly(ether-amide).

Here, the poly(ether-amide) is prepared by a polycondensation reaction of a carboxylic acid polyamide and an alcohol-terminated polyether, and it may be represented by Formula 1 below.

HO—(CO—PA—CO—O—PE—O)$_n$—H  [Formula 1]

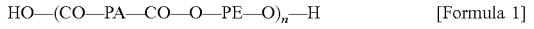

In Formula 1, PA represents a polyamide repeat unit, PE represents a polyether repeat unit, and n may be 10 to 20.

In a specific embodiment of the present invention, examples of the polyamide repeat unit include nylon 6, nylon 46, nylon 66, nylon 610, nylon 11, nylon 12, and nylon 6/66, but it is not limited thereto.

In a specific embodiment of the present invention, examples of the polyether repeat unit include polyethylene glycol (PEG), polypropylene glycol (PPG), and poly(tetramethylene ether) glycol (PTMEG), but it is not limited thereto.

In a specific embodiment of the present invention, the poly(ether-amide) may have a weight average molecular weight of 30,000 to 100,000 g/mole, preferably 40,000 to 60,000 g/mole, more preferably about 50,000 g/mole.

In a specific embodiment of the present invention, the poly(ether-amide) may have a density of 1.01 to 1.14 g/cm$^3$.

In a specific embodiment of the present invention, the poly(ether-amide) may comprise 20 to 70% by weight of a polyamide repeat unit and 30 to 80% by weight of a polyether repeat unit based on the total weight thereof.

In a preferred embodiment of the present invention, the poly(ether-amide) may be Pebax® 1657 in which the polyamide repeat unit is nylon 6, and the polyether repeat unit is polyethylene glycol. Pebax® 1657 may be represented by Formula 2 below in which the content of nylon 6, which is a polyamide repeat unit, may be 40% by weight, and the content of polyethylene glycol, which is a polyether repeat unit, may be 60% by weight.

[Formula 2]

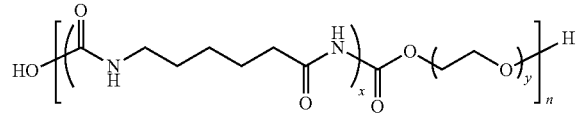

In Formula 2, x may be 57 to 60, y may be 33 to 40, and n may be 10 to 20.

In the polymer blend membrane according to an embodiment of the present invention, the content of the poly(ether-amide) may be 30 to 90% by weight based on the total weight of the poly(ether-amide) and the polyether. If the content of the poly(ether-amide) is less than 30% by weight, the mechanical properties of the polymer blend membrane to be prepared may be deteriorated; thus, it may not be suitable as a gas separation membrane. Meanwhile, if the content of poly(ether-amide) exceeds 90% by weight, the enhancement in permeability of carbon dioxide of the polymer blend membrane to be prepared may be insufficient.

The polymer blend membrane according to an embodiment of the present invention comprises a polyether (B). Here, the polyether (B) serves as a dispersed phase.

In a specific embodiment of the present invention, the polyether (B) may be prepared by in-situ radical polymerization of a polyether oligomer comprising a vinyl group.

In a specific embodiment of the present invention, the polyether (B) may have a weight average molecular weight of 200 to 1,500 g/mole and 4 to 34 of a polyether repeat unit.

In a specific embodiment of the present invention, the polyether oligomer containing a vinyl group may comprise at least one selected from the group consisting of poly (ethylene glycol) methacrylate, poly(ethylene glycol) methyl ether methacrylate, and poly(propylene glycol) methyl ether acrylate, but it is not particularly limited thereto.

In a preferred embodiment of the present invention, the polyether oligomer containing a vinyl group may comprise poly(ethylene glycol) methyl ether acrylate (PEGMEA) represented by Formula 3 below.

[Formula 3]

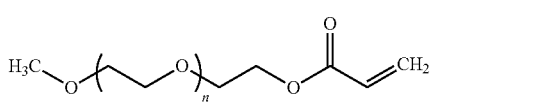

In Formula 3, n is an integer of 8 to 9, and the number average molecular weight (Mn) of PEGMEA may be about 480 g/mole.

In a specific embodiment of the present invention, the radical polymerization of the polyether oligomer containing a vinyl group may be carried out in the presence of an initiator. Examples of the initiator include benzoyl peroxide (BPO), di-tert-butyl peroxide (DTAP), potassium persulfate (KPS), 2,2'-azobis(2-methylpropionitrile (AIBN), and 4,4'-azobis-4-cyanopentanoic acid (ACVA), but it is not particularly limited thereto.

In a preferred embodiment of the present invention, the polyether (PPEGMEA or poly(PEGMEA)) produced by radical polymerization of PEGMEA may be represented by Formula 4 below.

[Formula 4]

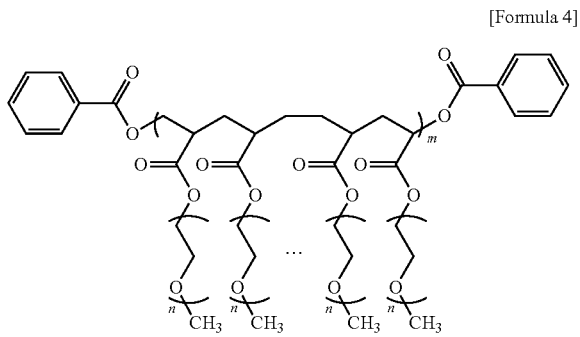

In Formula 4, n may be 8 to 9, and m may be 4 to 112.

In the polymer blend membrane according to an embodiment of the present invention, the content of the polyether (B) may be 10 to 70% by weight based on the total weight of the poly(ether-amide) and the polyether. If the content of the polyether (B) exceeds 70% by weight, the mechanical properties of the polymer blend membrane to be prepared may be deteriorated; thus, it may not be suitable as a gas separation membrane. Meanwhile, if the content of the polyether (B) is less than 10% by weight, the enhancement in permeability of carbon dioxide of the polymer blend membrane to be prepared may be insufficient.

In the polymer blend membrane according to an embodiment of the present invention, the polyether-based copolymer (A) serves as a matrix, and the polyether (B) serves as a dispersed phase.

In general, it is known that if a high amount of a low-molecular-weight polyether component is contained in a polymer matrix, the mechanical properties of the polymer blend membrane are deteriorated. In contrast, a low-molecular-weight polyether component is subjected to in-situ radical polymerization to form a spherical micellar structure and then dispersed in the matrix of the polyether-based copolymer in an embodiment of the present invention; thus, a polymer blend with excellent mechanical properties can be prepared.

Specifically, as shown in FIG. 1, PPEGMEA forms a spherical micellar structure through self-assembly in a mixture of ethanol and water. In such an event, as the molecular weight increases, a micellar structure can be better formed to reduce the interfacial free energy between the hydrophobic backbone (—CH—$CH_2$—) and the hydrophilic water. Since the spherical micellar structure of PPEGMEA thus formed with a high molecular weight remarkably increases the fractional free volume (FFV) of the Pebax® 1657 polymer matrix, it dramatically enhances the gas permeability. In addition, PPEGMEA enhances the $CO_2$ sorption capacity, so that the high selectivity of the polymer blend membrane for carbon dioxide can be maintained.

In a specific embodiment of the present invention, the polymer blend membrane may be a flat plate type. In such an event, the polymer blend membrane may have a thickness of 5 to 200 µm, preferably, a thickness of 10 to 100 µm, 20 to 80 µm, 30 to 80 µm, or 5 to 150 µm.

Alternatively, the polymer blend membrane may be a hollow fiber membrane. The hollow fiber membrane may be prepared by, for example, a dry-jet/wet-quench process. The hollow fiber membrane may have an outer diameter of 200 to 1,000 µm and an inner diameter of 100 to 800 µm. Preferably, the hollow fiber membrane may have an outer diameter of 550 to 650 µm and an inner diameter of 350 to 450 µm.

The polymer blend membrane according to an embodiment of the present invention can be advantageously used to separate carbon dioxide from a mixed gas.

Process for Preparing a Polymer Blend Membrane

According to another embodiment of the present invention, there is provided a process for preparing a polymer blend membrane, which comprises (1) dissolving a polyether-based copolymer resin; a polyether oligomer containing a vinyl group; and an initiator in a solvent; (2) subjecting the polyether oligomer containing a vinyl group to in-situ radical polymerization; and (3) molding the product obtained in step (2) in the form of a membrane and removing the solvent therefrom.

Step (1)

In step (1), a polyether-based copolymer resin; a polyether oligomer containing a vinyl group; and an initiator are dissolved in a solvent.

Here, details on the polyether-based copolymer resin, the polyether oligomer containing a vinyl group, and the initiator are as described above in the section of the polymer blend membrane.

The solvent is not particularly limited as long as the polyether-based copolymer resin; the polyether oligomer containing a vinyl group; and the initiator can be dissolved therein. Preferably, examples of the solvent include ethanol, water, N-methyl-2-pyrrolidone (NMP), dimethylformamide (DMF), dimethylacetamide (DMAc), and mixtures thereof, but it is not particularly limited thereto. In a specific embodiment of the present invention, the solvent may be a mixed solvent of ethanol and water. In a preferred embodiment of the present invention, the solvent may be a mixed solvent of 70% by weight of ethanol and 30% by weight of water.

The sequence of dissolving the polyether-based copolymer resin; the polyether oligomer containing a vinyl group; and the initiator is not particularly limited. The polyether-based copolymer resin; the polyether oligomer containing a vinyl group; and the initiator may be dissolved in a solvent in an arbitrary sequence. Alternatively, they may be dissolved in a solvent at the same time. Once the polyether-based copolymer resin; the polyether oligomer containing a vinyl group; and the initiator have been added to a solvent, they are stirred at room temperature for about 24 hours to be sufficiently dissolved.

In a specific embodiment of the present invention, the amount of the polyether-based copolymer resin dissolved in a solvent may be 3 to 10% by weight. If the amount of the polyether-based copolymer resin exceeds 10% by weight, it may be difficult to prepare a membrane since it may be easily gelated at room temperature.

In a specific embodiment of the present invention, the amount of the polyether oligomer containing a vinyl group may be 10 to 70% by weight based on the total weight of the polyether-based copolymer resin and the polyether oligomer containing a vinyl group dissolved in a solvent. If the content of the polyether oligomer exceeds 70% by weight, the mechanical properties of the polymer blend membrane to be prepared may be deteriorated; thus, it may not be suitable as a gas separation membrane. Meanwhile, if the content of the polyether oligomer is less than 10% by weight, the enhancement in permeability of carbon dioxide of the polymer blend membrane to be prepared may be insufficient.

In a specific embodiment of the present invention, the amount of initiator may be 0.5 to 3 moles per 100 moles of the polyether oligomer containing a vinyl group dissolved in a solvent. If the content of the initiator exceeds 3 moles, the micelle size of the polymerized polyether polymer is reduced; thus, it is difficult to effectively increase the distance between the chains of the polymer matrix.

Step (2)

In step (2), the polyether oligomer comprising a vinyl group is subjected to in-situ radical polymerization.

The in-situ radical polymerization of the polyether oligomer containing a vinyl group may be carried out at a temperature of 60 to 80° C. for 0.5 to 24 hours. Preferably, the in-situ radical polymerization of the polyether oligomer may be carried out at a temperature of about 80° C. for about 24 hours.

The process for preparing a polymer blend membrane according to an embodiment of the present invention may further comprise removing bubbles from the product using an ultrasonicator after the polymerization is completed.

Step (3)

In step (3), the product obtained in step (2) is molded in the form of a membrane, and the solvent is removed therefrom.

The method for molding the product obtained in step (2) in the form of a membrane is not particularly limited. As a specific example, the product obtained in step (2) is poured into a polystyrene petri dish and dried for about 3 days to obtain a membrane. In such an event, in order to facilitate evaporation of the solvent, it may be preferably further dried in a vacuum oven set at room temperature for 24 hours.

Gas Separation Method

According to another embodiment of the present invention, there is provided a method for separating gases, which comprises passing a mixed gas containing at least carbon dioxide through the polymer blend membrane according to an embodiment of the present invention to remove at least a portion of the carbon dioxide.

In a specific embodiment of the present invention, the method may comprise separating at least one gas from a mixture of two or more gases. For example, the method may comprise separating carbon dioxide from a mixed gas comprising a combination selected from carbon dioxide/nitrogen, carbon dioxide/carbon monoxide, carbon dioxide/oxygen, carbon dioxide/methane, carbon dioxide/hydrogen, and the like. But it is not particularly limited thereto.

EXAMPLE

Hereinafter, the present invention will be described in more detail with reference to Examples and Comparative Examples. However, the following examples are for illustrative purposes only and are not intended to limit the scope of the present invention.

The compounds used in the Examples and the Comparative Examples are as follows.

poly(ether-amide) (Pebax® 1657, Arkema)
polyether oligomer containing a vinyl group (PEGMEA, Sigma Aldrich; molecular weight 480 g/mole)
benzoyl peroxide (BPO) initiator (Sigma Aldrich)

Comparative Example 1

Ethanol and water were mixed at a weight ratio of 70:30 to prepare a solvent. Pebax was added to the mixed solvent prepared above in an amount of 3% by weight and dissolved in an oil bath at 80° C. for one day. Bubbles in the Pebax solution were removed using an ultrasonicator, and it was then poured into a polystyrene petri dish and dried at room temperature for 3 days. It was further dried in a vacuum oven at room temperature for one day to remove the residual solvent, thereby preparing a Pebax membrane.

Example 1

A 3% by weight Pebax solution was prepared in the same manner as in Comparative Example 1. PEGMEA was added to the Pebax solution such that the weight ratio of Pebax:PEGMEA was 80:20, 50:50, and 30:70, respectively. Subsequently, BPO was added such that the molar ratio of PEGMEA:BPO was 100:1. The solution thus obtained was stirred at room temperature for 2 hours. After all the components were dissolved, radical polymerization was carried out in an oil bath at 80° C. for 24 hours. Upon completion of the polymerization, bubbles in the solution were removed using an ultrasonicator, and it was then poured into a polystyrene petri dish and dried at room temperature for 3 days. It was further dried in a vacuum oven at room temperature for one day to remove the residual solvent, thereby preparing a Pebax/PPEGMEA_x(1) membrane. Here, x represents the initial weight ratio of PEGMEA to Pebax.

Example 2

Pebax/PPEGMEA_70(y) membranes were prepared in the same manner as in Example 1, except that the weight ratio of Pebax:PEGMEA was 30:70 and that the molar ratio of PEGMEA:BPO was adjusted to 100:1, 100:2, and 100:3, respectively. Here, y represents the number of moles of BPO per 100 moles of PEGMEA.

Comparative Example 2

A Pebax/PEGMEA_70 membrane was obtained in the same manner as in Comparative Example 1, except that PEGMEA was added to the Pebax solution such that the weight ratio of Pebax:PEGMEA was 30:70.

Test Example 1

Figures 2A, 2B:
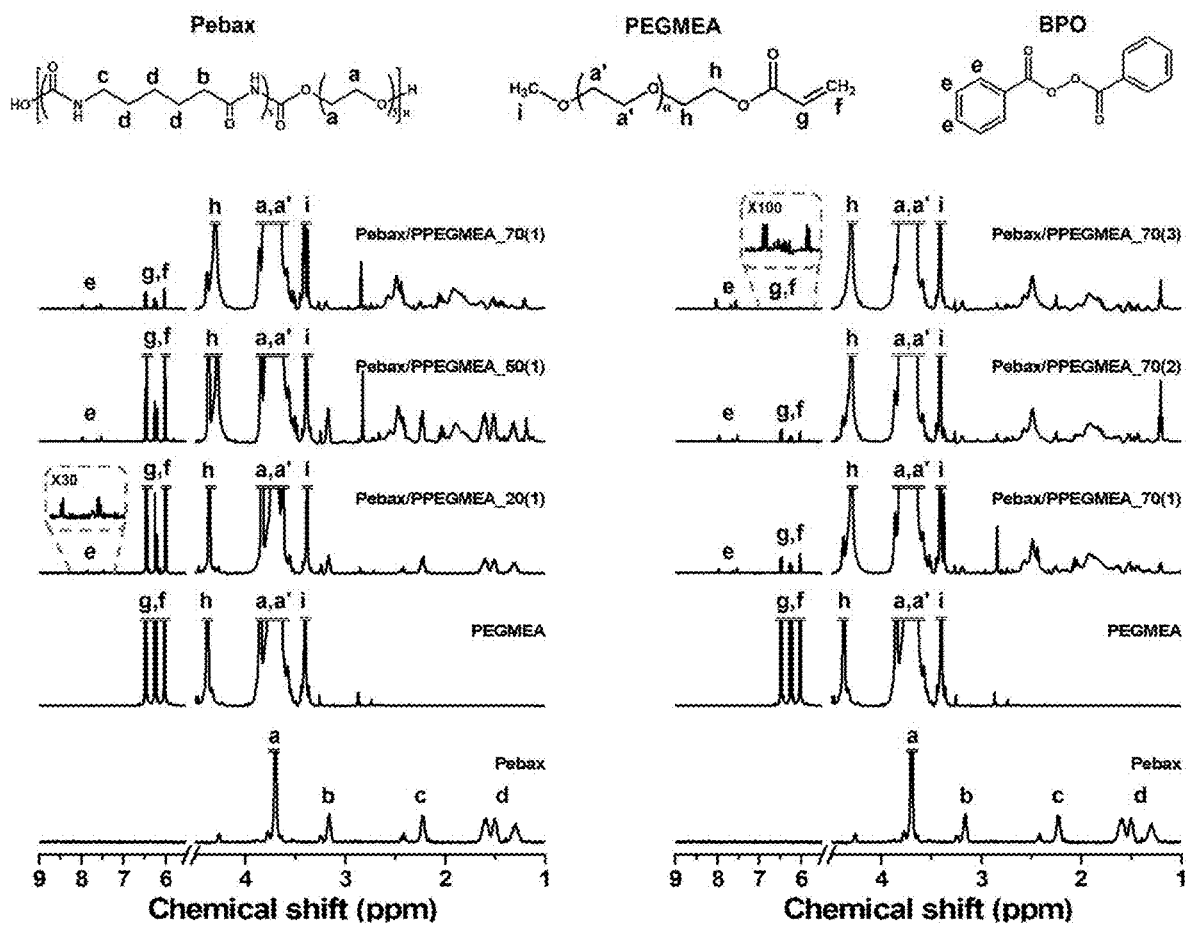
FIGS. 2(a) and (b) show a nuclear magnetic resonance ($^1$H-NMR) spectrum of a polymer membrane prepared according to an embodiment of the present invention.

$^1$H-NMR analysis was performed to confirm the structure of the Pebax, PEGMEA, and Pebax/PPEGMEA membranes and the degree of polymerization of PEGMEA, which is shown in FIGS. 2(a) and (b). The polyethylene oxide (PEO) group in Pebax appeared at 3.5-3.9 ppm (a), and the polyamide (PA) group appeared at 3-3.3 ppm (b), 2-2.6 ppm (c), and 1.8 ppm (d), respectively. The NMR peaks for PEGMEA appeared at 6-6.5 ppm (f, g), 4-4.5 ppm (h), and 3.3-3.4 ppm (i), which correspond to vinyl, methylene, and methoxy groups, respectively. The Pebax/PPEGMEA membranes exhibited a new peak at 7.2-8 ppm (e) of benzene.

The conversion ratio of the vinyl group in PEGMEA was calculated through the relative area change of the vinyl group (f, g) based on the area of the methoxy peak (i). Specifically, the conversion ratio of the vinyl group in PEGMEA was calculated by Equation 1 below.

$$\text{Conversion (\%)} = (A_i - A_{fg})/A_i \times 100 \quad \text{[Equation 1]}$$

Here, $A_i$ is the peak area of the methoxy group, and $A_{fg}$ is the sum of the peak areas of the vinyl group.

In all the Pebax/PPEGMEA membranes, the molecular weight of PPEGMEA was calculated as the product of the repeat units of PPEGMEA and the molecular weight of PEGMEA. Here, the repeat unit was calculated from the peak areas of the benzene group as a terminal group of the initiator and —CH—CH$_2$ as the main chain of PPEGMEA and the ratio of the number of protons thereof. Since the NMR peaks for the main chain (—CH—CH$_2$) of PPEGMEA overlaps with those of the PA (—CH—CH$_2$) group in Pebax, the theoretical number of —CH—CH$_2$ of PPEGMEA was calculated using the peak area and proton number of the vinyl group. Specifically, the molecular weight of PPEGMEA was calculated by Equation 2 below.

$$Mn_{NMR} = ((3 - A_{fg})/m_{fg})/(A_e/m_e) \quad \text{[Equation 2]}$$

Here, $A_{fg}$ is the sum of the peak areas of the vinyl group, $A_e$ is the peak area of the benzene group, $m_{fg}$ is the number of protons in the vinyl group, and $m_e$ is the number of protons in the benzene group.

The theoretical molecular weight of PPEGMEA was calculated by Equation 3 below.

$$Mn_{theory} = (\text{number of moles of PEGMEA})/(\text{number of moles of } BPO) \times (\text{molecular weight of PEGMEA}) \times (\text{conversion ratio of PEGMEA (\%)}) + (\text{molecular weight of } BPO) \quad \text{[Equation 3]}$$

The conversion ratio of the vinyl group and the molecular weight of PPEGMEA thus obtained are shown in Table 1 below.

TABLE 1

| Sample | Pebax:PPEGMEA (weight ratio) | PPEGMEA:BPO (molar ratio) | Conversion (%) | Mn, $_{NMR}$ (g/mole) | Mn, $_{theory}$ (g/mole) |
|---|---|---|---|---|---|
| Pebax/PPEGMEA_20(1) | 80:20 | 100:1 | 3.9 | 2,035 | 2,144 |
| Pebax/PPEGMEA_50(1) | 50:50 | 100:1 | 70.6 | 47,067 | 34,130 |
| Pebax/PPEGMEA_70(1) | 30:70 | 100:1 | 94.3 | 53,905 | 45,522 |
| Pebax/PPEGMEA_70(2) | 30:70 | 100:2 | 96.8 | 35,188 | 23,466 |
| Pebax/PPEGMEA_70(3) | 30:70 | 100:3 | 99.7 | 20,278 | 16,194 |

As the content of BPO increased from 1 mole to 3 moles in Pebax/PPEGMEA_70(y), the conversion of the vinyl group increased, while the molecular weight decreased. As the content of PEGMEA decreased from 70% by weight to 20% by weight in Pebax/PPEGMEA_x(1), both the conversion and the molecular weight decreased. It was confirmed from these results that the theoretically calculated molecular weight (Mn$_{theory}$) and the molecular weight obtained by $^1$H-NMR were similar.

Test Example 2

Figures 3A, 3B, 3C:
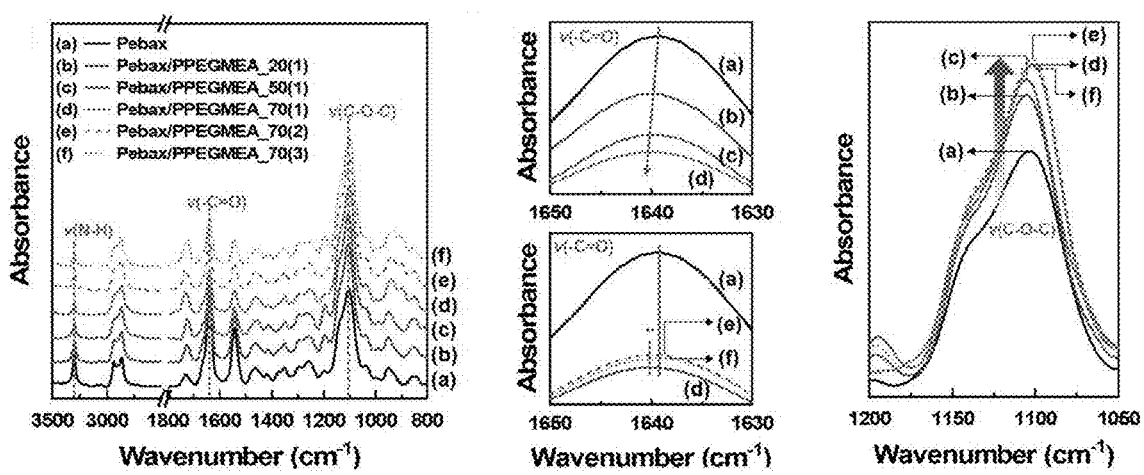
FIGS. 3(a)-(c) are graphs showing a Fourier-transform infrared spectroscopy (FT-IR) result of a polymer membrane prepared according to an embodiment of the present invention.

FT-IR analysis of the Pebax and Pebax/PPEGMEA membranes was performed, and the results are shown in FIGS. 3(a)-(c). In the Pebax membrane, the hydrogen-bonded —NH group (stretching vibration) and the hydrogen-bonded —C=O group (stretching vibration) of PA appeared at 3,296 cm$^{-1}$ and 1,637 cm$^{-1}$, respectively, and the hydrogen-bonded —C=O groups (stretching vibration) and the hydrogen-bonded C—O—C groups (stretching vibration) of PEO appeared at 1,730 cm$^{-1}$ and 1,100 cm$^{-1}$, respectively. The same peaks were observed in all the Pebax/PPEGMEA membranes.

It was confirmed that the peak intensity of the C—O—C group increased as compared with Pebax in all the membranes to which PPEGMEA had been introduced. This attributes to the fact that when PEGMEA containing 80% by weight of PEG was mixed with Pebax (60% by weight of PEG), a relatively higher concentration of PEG than Pebax was introduced. In the PA in Pebax, a crystalline structure was induced through hydrogen bonding between the —NH group and the —C=O group. In all the Pebax/PPEGMEA membranes, the —C=O bond of PA moved to a higher frequency than Pebax while the hydrogen bond was reduced. As a result, an amorphous region was formed by interfering with the formation of a crystalline structure between PAs.

Test Example 3

XRD analysis of the Pebax and Pebax/PPEGMEA membranes was performed, and the results are shown in FIGS. 4(a) and (b). An amorphous region appeared in a wide region between a diffraction angle (2-theta) of 15° to 25°, and a strong peak appeared at 23.8°, which indicates a crystalline region of the polymer. The d-spacing values for the amorphous region are shown in Table 2. As the content of PEGMEA(x) increased from 20% to 70% by weight in Pebax/PPEGMEA_x(y), the d-spacing increased from 4.24 Å to 4.30 Å as compared with Pebax. In addition, as BPO(y) increased from 1 mole to 3 moles, it decreased slightly from 4.30 Å to 4.27 Å.

TABLE 2

| Sample | d-spacing(Å) |
|---|---|
| Pebax | 4.20 |
| Pebax/PPEGMEA_20(1) | 4.24 |
| Pebax/PPEGMEA_50(1) | 4.27 |
| Pebax/PPEGMEA_70(1) | 4.30 |
| Pebax/PPEGMEA_70(2) | 4.28 |
| Pebax/PPEGMEA_70(3) | 4.27 |

Test Example 4

To check the fractional free volume (FFV) of the prepared membranes, the densities of all the membranes were measured, and FFV was calculated therefrom. The repeat units of PPEGMEA were calculated by $^1$H-NMR. As shown in FIGS. 5(a) and (b), the Pebax/PPEGMEA membranes showed a higher FFV than that of Pebax membrane, whereas their densities decreased. As the content of PEGMEA increased from 20% by weight to 70% by weight in Pebax/PPEGMEA_x(1), the FFV increased and the density decreased. On the other hand, as the content of BPO increased from 1 mole to 3 moles in Pebax/PPEGMEA_70 (y), the FFV decreased and the density increased. Here, Pebax/PPEGMEA_70(1) had the highest FFV of 0.13.

Test Example 5

Figure 6A:
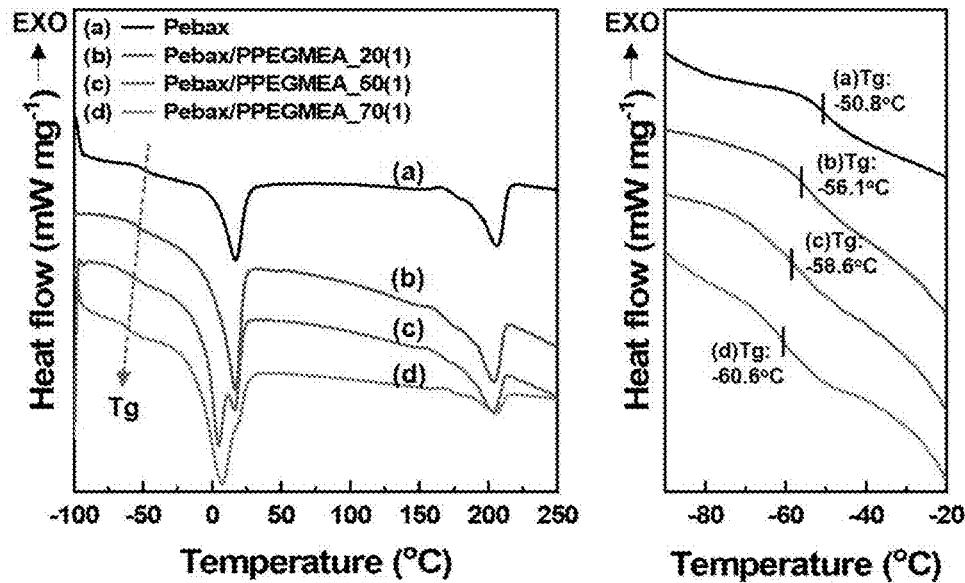
FIGS. 6(a) and (b) are graphs showing a differential scanning calorimetry (DSC) result of a polymer membrane prepared according to an embodiment of the present invention.
Figure 6B:
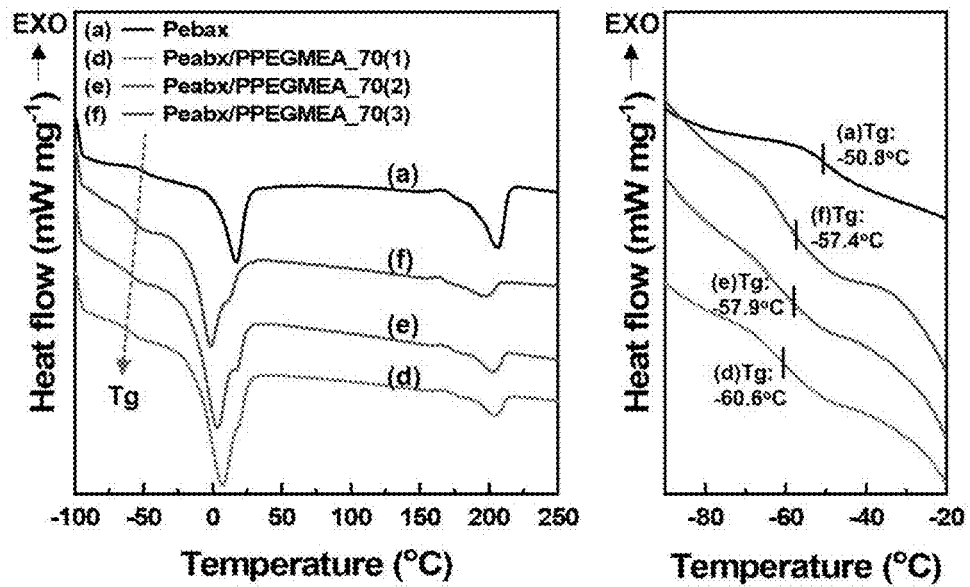
Figure 9A:
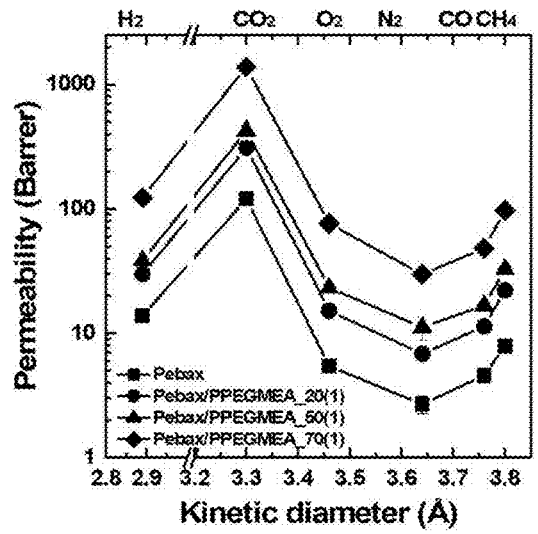
FIGS. 9(a)-(d) are graphs showing the gas permeability and selectivity under a single gas condition of a polymer membrane prepared according to an embodiment of the present invention.
Figure 9B:
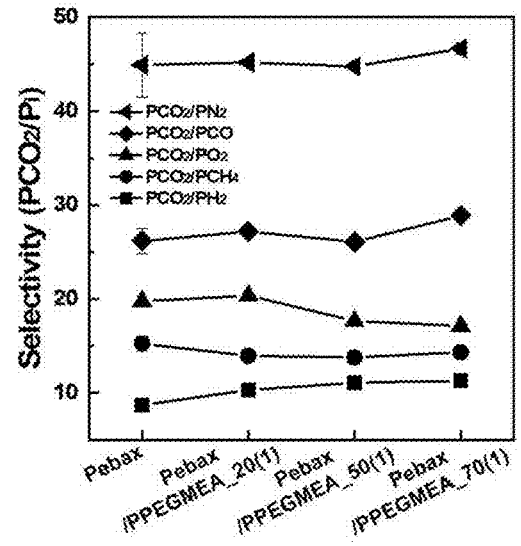
Figure 9C:
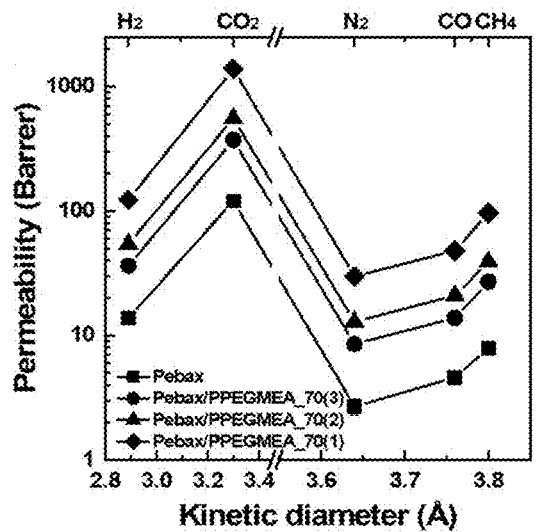
Figure 9D:
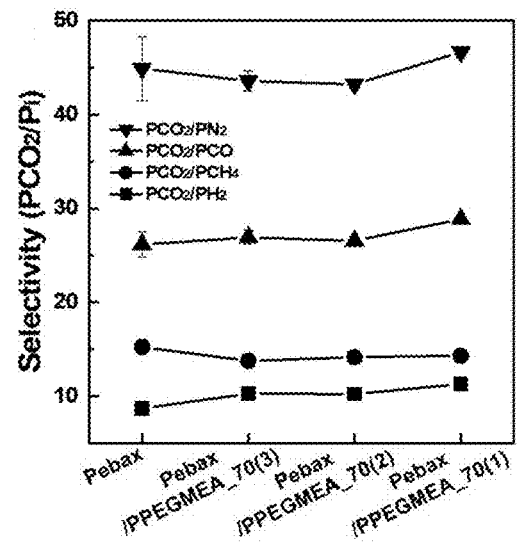
Figure 10A:
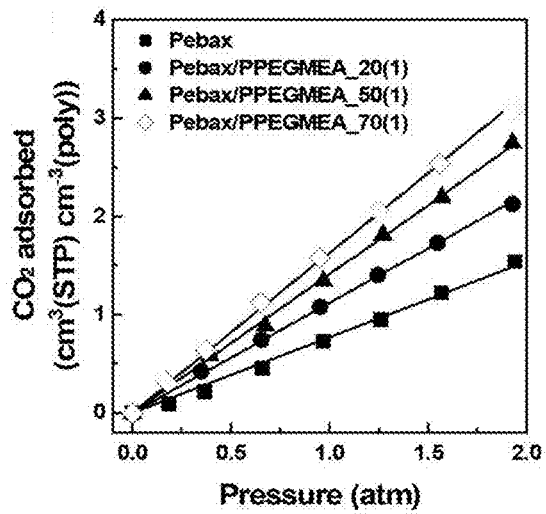
FIGS. 10(a)-(d) show adsorption isotherms for $CO_2$ and $CH_4$ of a polymer membrane prepared according to an embodiment of the present invention.
Figure 10B:
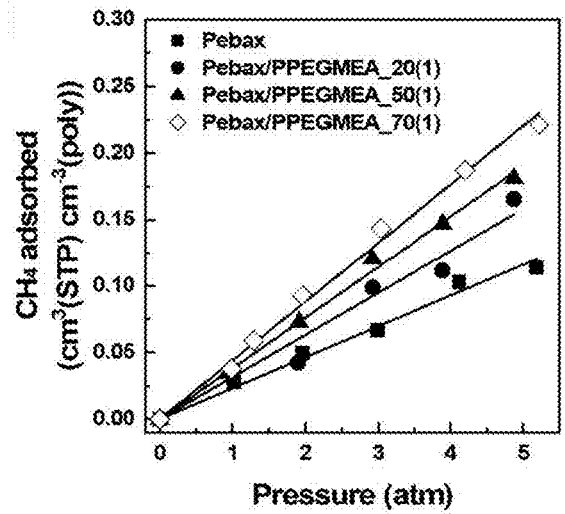
Figure 10C:
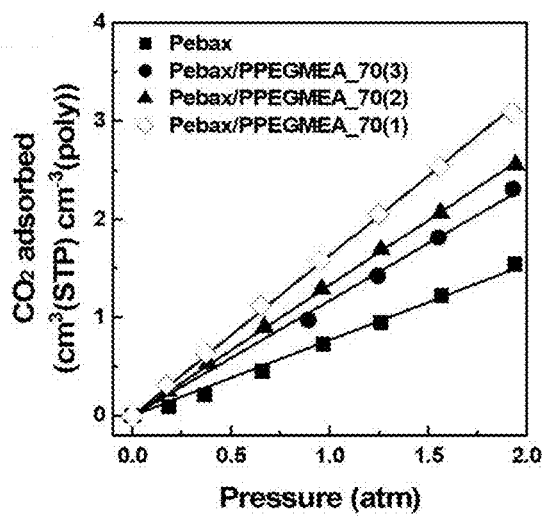
Figure 10D:
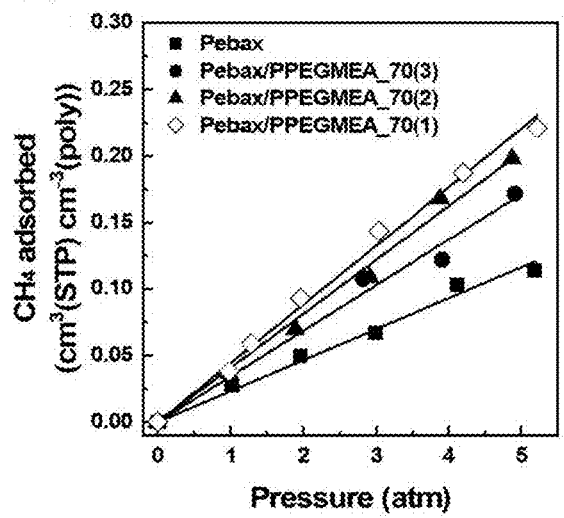

DSC analysis of the Pebax and Pebax/PPEGMEA membranes was performed for the glass transition temperature (Tg) and the melting temperature (Tm) of PEG and PA, and the results are shown in FIGS. 6(a) and (b).

The Pebax membrane showed endothermic peaks of PEG and PA at 17° C. and 206.2° C., respectively, and the Tg of PEG at −50.8° C. All the Pebax/PPEGMEA membranes had a lower Tg than that of Pebax. When the initiator was 1 mole, the Tg decreased from −56.1° C. to −60.6° C. as the content of PPEGMEA increased from 20% by weight to 70% by weight. In addition, when the content of PEGMEA was 70% by weight, the Tg decreased from −57.4° C. to −60.6° C. as the BPO decreased from 3 moles to 1 mole. It is understood that the reason that Tg decreased as compared with Pebax is attributable to the fact that PPEGMEA increased the FFV of Pebax as an additive and increased the mobility of the polymer chains.

The crystallinity (Xc) of PEO or PA in the prepared membranes can be calculated through the ratio of the corresponding melting enthalpy ($\Delta H_m$) and pure crystalline melting enthalpy ($\Delta H_m^\circ$). These are shown in Table 3.

It is understood that in the Pebax/PPEGMEA membranes, the miscibility of PPEGMEA with the Pebax matrix increased through an increase in Xc of PEG than that of Pebax, and Xc increased by the entanglement between PPEGMEA and Pebax matrix through in-situ radical polymerization. On the other hand, the Xc of PA decreased as the content of PEGMEA increased, and it decreased as the content of the initiator increased at the same 70% by weight. As confirmed above, PPEGMEA reduced the crystallinity by interfering with hydrogen bonding between the PA chains in Pebax.

TABLE 3

| Sample | Tg (° C.) | Xc (%) PEG | PA |
|---|---|---|---|
| Pebax | −50.8 | 21.81 | 11.98 |
| Pebax/PPEGMEA_20(1) | −56.1 | 26.71 | 11.83 |
| Pebax/PPEGMEA_50(1) | −58.6 | 33.84 | 7.87 |
| Pebax/PPEGMEA_70(1) | −60.6 | 35.29 | 4.10 |
| Pebax/PPEGMEA_70(2) | −57.9 | 31.12 | 3.81 |
| Pebax/PPEGMEA_70(3) | −57.4 | 27.03 | 3.14 |

Test Example 6

Since it is known that the mechanical properties decrease as a low-molecular-weight PEG is introduced into Pebax, the mechanical properties of the membranes with respect to the content of the initiator were measured for the membranes in which Pebax was blended with 70% by weight of PEG-MEA. Specifically, Young's modulus and hardness were measured through nanoindentation, and the results are shown in FIG. 7.

Pebax/PEGMEA_70 and all the Pebax/PPEGMEA membranes showed lower Young's modulus and hardness than Pebax. It is understood that this is attributable to the fact that the PA region having excellent mechanical properties was relatively reduced from 40% of Pebax to 12% of Pebax/PPEGMEA_70. Despite the above, all the membranes in which PPEGMEA had been introduced in an amount of 70% by weight showed relatively high Young's modulus and hardness as compared with Pebax/PEGMEA_70 membrane. In particular, Pebax/PPEGMEA_70(1) showed the highest values. It is understood that PPEGMEA formed by in-situ radical polymerization had a higher molecular weight than that of PEGMEA, and the mechanical properties of the membranes were enhanced by the entanglement of PPEGMEA and the Pebax matrix.

Test Example 7

The morphology and structure of the prepared membranes were observed using TEM, and the results are shown in FIGS. 8(a)-(f). Pebax of FIG. 8(a) had a PEO region and a dark PA region, with a microphase-separation form. The PA region showed a lamellar structure and had a crystalline structure.

A black spherical PPEGMEA was observed in the Pebax/PPEGMEA_70(y) membranes (FIG. 8(d-f)). In Pebax/PPEGMEA_20(1) and Pebax/PPEGMEA_50(1), smaller spheres as indicated by arrows than the three types in Pebax/PPEGMEA_70(y) were observed. As can be seen from the $^1$H-NMR analysis above, it seems difficult to observe them in TEM because the conversion ratio of the vinyl group was lower than that of Pebax/PPEGMEA_70(y), so that the content of PPEGMEA formed in the Pebax polymer matrix was low.

In Pebax/PPEGMEA_70(y), as the content of BPO decreased, the conversion ratio of vinyl groups decreased, whereas the molecular weight increased, thereby increasing the size of micellar PPEGMEA (FIG. 8(d-f)). In particular, micellar PPEGMEA with a size of approximately 150 nm was observed in Pebax/PPEGMEA_70(1). PEGMEA formed PPEGMEA (or poly(PEGMEA)) through in-situ radical polymerization in an ethanol/water solvent, showing a micellar structure through self-assembly.

The micellar-structured PPEGMEA is composed of a hydrophobic —$CH_2$—CH—(backbone) group and a hydrophilic PEG group. The hydrophobic groups form a micellar structure to reduce interfacial free energy with water. As the molecular weight of PPEGMEA increases, its size increases due to aggregation between the PPEGMEA chains of the formed micelles. As the size of micelles increases, they have a bulky structure, which can effectively increase the distance between the chains of the Pebax matrix.

Test Example 8

The membranes prepared in the Examples were each measured for the gas permeability of hydrogen ($H_2$), carbon dioxide ($CO_2$), oxygen ($O_2$), nitrogen ($N_2$), carbon monoxide (CO), and methane ($CH_4$). The results are shown in FIGS. 9(a)-(d) and Table 4. In addition, the selectivities for $CO_2/H_2$, $CO_2/N_2$, $CO_2/O_2$, $CO_2/CO$, and $CO_2/CH_4$ based thereon are shown in Table 5.

The Pebax/PEGMEA membrane in which 70% by weight of oligomeric PEGMEA had been introduced had very poor mechanical properties, as confirmed by the measurements of Young's modulus and hardness, so that it was difficult to measure the separation performance. In contrast, all the Pebax/PPEGMEA membranes had enhanced permeability regardless of the gas type as compared with Pebax. As the content of PEGMEA increased or the content of BPO decreased, the gas permeability further increased. This conforms to the FFV trend as described above concerning FIGS. 5(a) and (b).

The $CO_2$ permeability in Pebax/PPEGMEA_70(1) was 1,388.3±65 Barrer, which was increased by 1,054% as compared with the pristine Pebax. Although the permeability of $CO_2$ was significantly enhanced, the selectivity for $CO_2/H_2$, $CO_2/N_2$, $CO_2/O_2$, $CO_2/CO$, and $CO_2/CH_4$ was hardly changed. It is understood that this is attributable to the fact that the sorption capacity for $CO_2$ was enhanced by the increased amount of PEG introduced.

In all the membranes, the gas permeability decreased in the order of $CO_2>>H_2>CH_4>O_2>CO>N_2$. It is understood that the excellent permeability characteristics for $CO_2$ are attributable to the dipole-quadrupole interaction between PEG and $CO_2$. In addition, $CH_4$, which has a larger kinetic diameter than CO and $N_2$, had higher permeability due to the relatively high condensability of the rubbery polymer membrane.

TABLE 4

| Sample | Permeability (Barrer) | | | | | |
|---|---|---|---|---|---|---|
|  | $CO_2$ | $H_2$ | $CH_4$ | $O_2$ | CO | $N_2$ |
| Pebax | 120.3 ± 9.6 | 13.8 ± 0.5 | 7.9 ± 0.2 | 5.4 | 4.6 ± 0.6 | 2.7 ± 0.4 |
| Pebax/PPEGMEA_20(1) | 308.4 | 29.9 | 22.1 | 15.1 | 11.3 | 6.8 |
| Pebax/PPEGMEA_50(1) | 424.7 | 38.3 | 30.8 | 24.1 | 16.3 | 9.4 |
| Pebax/PPEGMEA_70(1) | 1,388.3 ± 3.0 | 120.3 ± 4.0 | 96.9 ± 5.2 | 78.7 | 48.1 ± 3.02 | 29.8 ± 2.4 |
| Pebax/PPEGMEA_70(2) | 556.1 | 54.3 | 39.3 | — | 21.0 | 12.9 |
| Pebax/PPEGMEA_70(3) | 372.1 ± 1.0 | 36.3 ± 1.0 | 27.0 ± 2.6 | — | 13.8 ± 1.0 | 8.5 ± 0.6 |

TABLE 5

| Sample | Selectivity ($P_i/P_j$) | | | | |
|---|---|---|---|---|---|
|  | $CO_2/N_2$ | $CO_2/CO$ | $CO_2/O_2$ | $CO_2/CH_4$ | $CO_2/H_2$ |
| Pebax | 44.9 ± 3.4 | 26.2 ± 1.4 | 19.7 | 15.2 ± 0.8 | 8.7 ± 0.4 |
| Pebax/PPEGMEA_20(1) | 45.2 | 27.2 | 20.4 | 13.9 | 10.3 |
| Pebax/PPEGMEA_50(1) | 44.7 | 26.1 | 17.7 | 13.8 | 11.3 |
| Pebax/PPEGMEA_70(1) | 46.7 ± 0.6 | 28.8 ± 0.1 | 17.1 | 14.3 ± 0.2 | 11.6 ± 0.4 |
| Pebax/PPEGMEA_70(2) | 43.2 | 26.6 | — | 14.2 | 10.2 |
| Pebax/PPEGMEA_70(3) | 43.6 ± 1.1 | 26.9 ± 0.8 | — | 13.8 ± 0.7 | 10.3 ± 0.2 |

In order to check the gas diffusion coefficient and sorption coefficient of the prepared membranes, a gas adsorption experiment for carbon dioxide and methane was performed. The results are shown in FIGS. 10(a)-(d). Since all the membranes are rubbery polymers, the adsorption isotherms of both $CO_2$ and $CH_4$ followed Henry's law. As the content of PEGMEA increased or the content of BPO decreased in the Pebax/PPEGMEA membranes, the gas sorption uptake of carbon dioxide and methane increased.

The sorption coefficient and diffusion coefficient and the corresponding solubility selectivity and diffusivity selectivity based on the above experimental results are shown in Table 6. As the content of PEGMEA increased or the content of BPO decreased, both the diffusion coefficient and sorption coefficient of carbon dioxide and methane increased. As the content of PEGMEA in Pebax/PPEGMEA_x(1) increased, the chain mobility of the polymer membranes increased, enhancing the diffusion coefficient owing to the enhanced FFV. The FFV increased due to the formation of bulky micellar structures as the content BPO decreased in Pebax/PPEGMEA_70(y).

The sorption coefficient of carbon dioxide increased as the content of PPEGMEA increased in all the Pebax/PPEGMEA membranes as compared with Pebax. As the content of PEGMEA increased or the content of BPO decreased, the sorption selectivity increased, and a trade-off relationship with lower diffusivity selectivity than Pebax in the Pebax/PPEGMEA membranes was confirmed. Thus, it was confirmed that the ideal selectivity for carbon dioxide/methane, which is the product of a diffusivity selectivity and solubility selectivity, was maintained.

It was confirmed through the above experimental results that the FFV and the amorphous region increased by PPEGMEA as an additive, which enhanced the gas permeation characteristics, and selective separation of $CO_2$ by PEG was possible.

TABLE 6

| Sample | $D^a$ | | $S^b$ | | $D_i/D_j$ | $S_i/S_j$ |
|---|---|---|---|---|---|---|
| | $CO_2$ | $CH_4$ | $CO_2$ | $CH_4$ | $CO_2/CH_4$ | $CO_2/CH_4$ |
| Pebax | 1.10 ± 0.08 | 2.38 ± 0.08 | 109.69 ± 0.82 | 3.32 ± 0.04 | 0.46 ± 0.02 | 33.1 ± 0.2 |
| Pebax/PPEGMEA_20(1) | 1.65 | 4.08 | 187.49 | 5.42 | 0.40 | 34.6 |
| Pebax/PPEGMEA_50(1) | 1.77 | 4.53 | 239.66 | 6.81 | 0.39 | 35.2 |
| Pebax/PPEGMEA_70(1) | 5.45 ± 0.27 | 13.90 ± 1.20 | 255.32 ± 29.61 | 7.01 ± 0.98 | 0.39 ± 0.01 | 36.4 ± 0.9 |
| Pebax/PPEGMEA_70(2) | 2.44 | 6.09 | 227.93 | 6.45 | 0.40 | 35.3 |
| Pebax/PPEGMEA_70(3) | 1.99 ± 0.27 | 4.99 ± 0.54 | 188.57 ± 16.93 | 5.43 ± 0.42 | 0.40 ± 0.01 | 34.7 ± 0.4 |

Figure 11A:
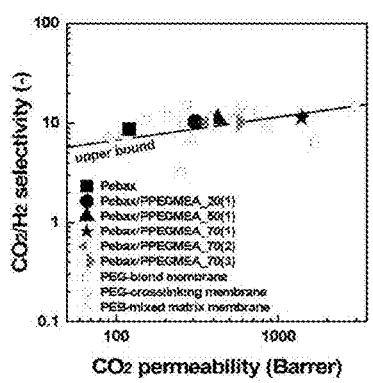
FIGS. 11(a)-(c) are graphs showing the gas separation performance of a polymer membrane prepared according to an embodiment of the present invention in terms of the upper bound of polymers.
Figure 11B:
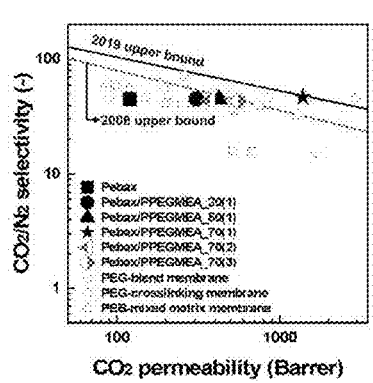
Figure 11C:
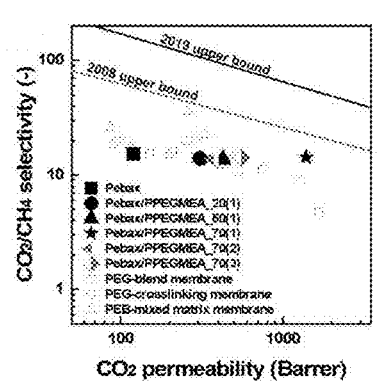

FIGS. 11(a)-(c) shows the separation performance of the Pebax and Pebax/PPEGMEA membranes for $CO_2/H_2$, $CO_2/N_2$, and $CO_2/CH_4$ as compared with the reported upper bound of conventional polymer membranes. All the Pebax/PPEGMEA membranes showed overall superior separation performance as compared with the Pebax membrane. In particular, the Pebax/PPEGMEA_70(1) polymer blend membrane showed the best separation performance.

Test Example 9

Figure 12A:
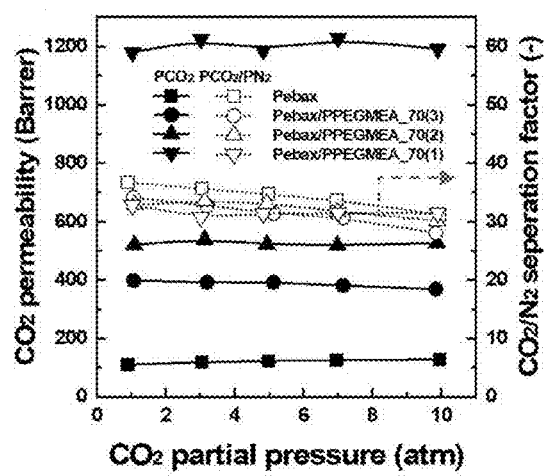
FIGS. 12(a) and (b) are graphs showing the mixed gas permeability and selectivity of a polymer membrane prepared according to an embodiment of the present invention.
Figure 12B:
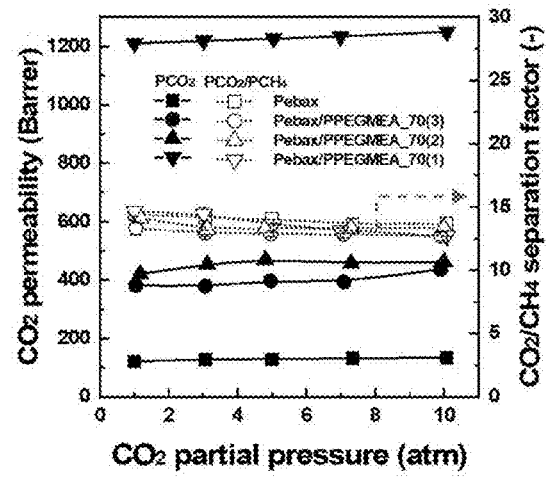

The permeability behavior of the Pebax and Pebax/PPEGEMA_70(y) membranes for a mixed gas of $CO_2/N_2$ (50:50 molar ratio) and $CO_2/CH_4$ (50:50 molar ratio) was observed with a change in pressure. The results are shown in FIGS. 12(a) and (b).

Similar permeability to the single gas permeability results was confirmed in all the membranes at a $CO_2$ partial pressure of 1 atm. In addition, the separation factor for $CO_2/CH_4$ was 13.3-14.7, which was not significantly different from the gas permeation selectivity (13.8-15.2) under the single gas condition, whereas the separation factor for $CO_2/N_2$ was reduced by 20% as compared with the gas permeation selectivity under the single gas condition.

It is understood that $CO_2$ adsorbed on a polymer matrix caused plasticization of the matrix to enhance the permeability of $N_2$, which is a non-condensable gas. As the partial pressure of $CO_2$ increased from 1 bar to 10 bar, the permeability of $CO_2$ increased and the selectivity of $CO_2/CH_4$ and $CO_2/N_2$ decreased. A separation membrane prepared by simply mixing 50% by weight or more of a PEG-based monomer or oligomer in Pebax has been reported to have a sharp decrease in permeability at a pressure of 1 bar or more (see Sep. Purif. Technol, 2021, 261, 118243). In contrast, in the Pebax/PPEGMEA_70(y) membrane of the present invention, the gas permeability and selectivity remained almost constant over the pressure range from 1 to 10 bar ($CO_2$ partial pressure) despite 70% by weight of PPEGMEA being introduced. It can be seen from this result that PPEGMEA introduced in a high content shows excellent separation performance and durability.

What is claimed is:

1. A polymer blend membrane, comprising:
   30 to 90% by weight of a polyether-based copolymer (A); and
   10 to 70% by weight of a polyether (B),
   based on the total weight of components (A) and (B),
   wherein the polyether (B) is prepared by in-situ radical polymerization of a polyether oligomer comprising a vinyl group.

2. The polymer blend membrane of claim 1, wherein the polyether-based copolymer (A) comprises at least one of the group consisting of poly(ether-amide) (PEA), polyethersulfone (PES), and poly(ether-imide) (PEI).

3. The polymer blend membrane of claim 2, wherein the polyether-based copolymer (A) comprises a poly(ether-amide), and the polyamide repeat unit in the poly(ether-amide) comprises at least one of the group consisting of nylon 6, nylon 46, nylon 66, nylon 610, nylon 11, nylon 12, and nylon 6/66.

4. The polymer blend membrane of claim 2, wherein the polyether-based copolymer (A) comprises a poly(ether-amide), and the polyether repeat unit in the poly(ether-amide) comprises at least one of the group consisting of polyethylene glycol (PEG), polypropylene glycol (PPG), and poly(tetramethylene ether) glycol (PTMEG).

5. The polymer blend membrane of claim 2, wherein the polyether-based copolymer (A) comprises a poly(ether-amide), the polyamide repeat unit in the poly(ether-amide) comprises nylon 6, and the polyether repeat unit in the poly(ether-amide) comprises polyethylene glycol.

6. The polymer blend membrane of claim 1, wherein the polyether oligomer containing a vinyl group comprises at least one of the group consisting of poly(ethylene glycol) methacrylate, poly(ethylene glycol) methyl ether methacrylate, and poly(propylene glycol) methyl ether acrylate.

7. The polymer blend membrane of claim 6, wherein the polyether oligomer containing a vinyl group comprises poly(ethylene glycol) methyl ether acrylate.

8. The polymer blend membrane of claim 1, wherein the polyether-based copolymer (A) serves as a matrix, and the polyether (B) serves as a dispersed phase.

9. The polymer blend membrane of claim 8, wherein the polyether (B) forms a spherical micellar structure through self-assembly.

\* \* \* \* \*